United States Patent [19]
Onoda

[11] 3,827,371
[45] Aug. 6, 1974

[54] LINEAR AND ROTARY MOTOR DRIVING SYSTEM FOR ELECTRIC CAR

[75] Inventor: Yoshimitsu Onoda, Katsuta, Japan

[73] Assignee: Hitachi, Ltd., Tokyo, Japan

[22] Filed: Sept. 19, 1972

[21] Appl. No.: 290,355

[30] Foreign Application Priority Data
Sept. 20, 1971 Japan.............................. 46-72423

[52] U.S. Cl.............. 104/148 LM, 310/12, 318/135
[51] Int. Cl................................................ B60l 9/16
[58] Field of Search.............. 104/148 LM, 148 MS; 318/135, 49; 191/10; 310/12, 13

[56] References Cited
UNITED STATES PATENTS

| | | | |
|---|---|---|---|
| 461,057 | 10/1891 | Shover et al........................... | 191/10 |
| 573,819 | 12/1896 | Leffler................................... | 310/13 |
| 3,513,338 | 5/1970 | Poloujadoff.................. | 104/148 LM |
| 3,549,966 | 12/1970 | Wilson......................... | 104/148 LM |
| 3,568,016 | 3/1971 | Barber................................... | 318/49 |
| 3,577,929 | 5/1971 | Onoda......................... | 104/148 LM |
| 3,586,935 | 6/1971 | Lundelius et al..................... | 318/49 |
| 3,712,240 | 1/1973 | Donlon et al.:............... | 104/148 LM |

*Primary Examiner*—M. Henson Wood, Jr.
*Assistant Examiner*—George H. Libman
*Attorney, Agent, or Firm*—Craig & Antonelli

[57] ABSTRACT

A driving system for an electric car comprising a linear motor, a controlled rectifier device, and a d.c. motor connected to the wheels of the car. The primary winding of the linear motor is disposed along a track for producing a mobile magnetic field, while the secondary winding thereof is disposed on the car and is connected to the controlled rectifier device which drives the d.c. motor. The controlled rectifier device is suitably controlled so that the propulsive force can be developed by the d.c. motor in a low speed range and by the linear motor in a high speed range.

7 Claims, 4 Drawing Figures

LINEAR AND ROTARY MOTOR DRIVING SYSTEM FOR ELECTRIC CAR

In the selection of driving systems it is important to consider the tendency toward the increase in the speed of rolling stock. The wheel driving system utilizing the adhesive effort between the wheels and the rail track has been put into practical use up to now. With the increase in the speed of the rolling stock, however, the adhesive effort has reached a limit and a driving system which does not resort to the adhesive effect is now demanded.

According to experiments, it has been found that three hundred and several tens kilometers per hour is a practical speed limit which can be obtained with the wheel driving system resorting to the adhesive effort and the propulsive force or braking force cannot be utilized any more at a speed higher than the above limit.

A linear motor has been found to be one of the effective means for driving an electric car in the high speed range higher than the above limit, and it has been proposed, at the same time, to employ a superconducting magnet so as to float the car above the rails by utilizing magnetic repulsion. When this driving system is employed, the car can be driven at a speed of 400 to 500 kilometers per hour. According to this floating driving system, the superconducting magnet is disposed on the car and a conductive plate is disposed on the side of the track so as to obtain a force for floating the car by the eddy current which is produced in the conductive plate when the superconducting magnet passes over the conductive plate. Thus, the force floating the car is very weak when the speed of the car is low, and actually, the floating of the car occurs at a speed higher than about 200 to 300 kilometers per hour although such speed varies depending on the design. Therefore, means are required for supporting the car body at a speed lower than the above value, and wheels are generally provided for this purpose.

On the other hand, one of the armature (primary side) and the field system (secondary side) of the linear motor driving the car must be disposed on the car and the other must be disposed along the track on the ground. However, due to the fact that the car is driven at a very high speed and from the viewpoint of difficulty of mounting a current collecting device, the armature (primary side) is preferably disposed on the ground. In this case, a mobile magnetic field is produced along the track on the ground, and a control device should be disposed on the ground so that the speed of the linear motor which may be anyone of the linear induction type, linear synchronous type and linear thyristor type can be smoothly controlled over a wide speed range. The speed control is attained by, for example, frequency control or voltage control and a cycloconverter or voltage regulator is disposed on the ground.

The driving system above described includes several major problems as follows:

1. Due to the disposition of the converter on the ground, the cost increases with the increase in the track length.
2. The control of the car speed at the side of the ground requires a very complex method of driving the car and poses a problem in respect of reliability.
3. An auxiliary power supply for supplying the lighting and other power requirement in the car is difficult to provide.

It is therefore an object of the present invention to provide a driving system for an electric car in which means are provided so that the driver on the car can freely control the speed of the car, thereby improving the reliability of the car driving operation.

Another object of the present invention is to provide a driving system for an electric car which eliminates substantially the need for provision of control means on the ground for the purpose of speed control by virtue of the fact that the speed of the car can be controlled on the car, thereby simplifying the structure and reducing the cost of ground equipment.

A further object of the present invention is to provide a driving system for an electric car in which the reactive power of a linear motor appearing when the car is running at a low speed is utilized for obtaining a driving force, thereby improving the power factor of the power source.

According to the present invention, an armature winding (primary winding) of a linear motor is disposed on the ground to be energized by an a.c. power source so that it can produce a mobile magnetic field along a rail track. On the other hand, a field winding (secondary winding) of the linear motor is mounted on a car for obtaining a propulsive force. Further, a controllable power converter is connected to the field winding, and a load is connected to the output of the power converter. By virtue of such an arrangement, the propulsive force produced by the linear motor can be controlled by suitably controlling the power converter so that the speed of the car can be controlled by the driver on the car. Although various kinds of control can naturally be applied from the ground, it is necessary in such a case to provide a cycloconverter or voltage regulator as described previously.

More specifically, in an embodiment of the present invention, the controllable power converter is preferably a controlled rectifier device and the load is preferably a d.c. motor connected to the wheels. In such a preferred embodiment, the reactive power of the linear motor can be utilized in a low speed range for deriving the propulsive force from the d.c. motor with good efficiency by controlling the controlled rectifier device, and with the increase in the speed of the car, successively greater amounts of the propulsive force can be continuously derived from the linear motor instead of the d.c. motor.

Other objects, features and advantages of the present invention will be apparent from the following detailed description taken in conjunction with the accompanying drawings, in which.

Figure 1:
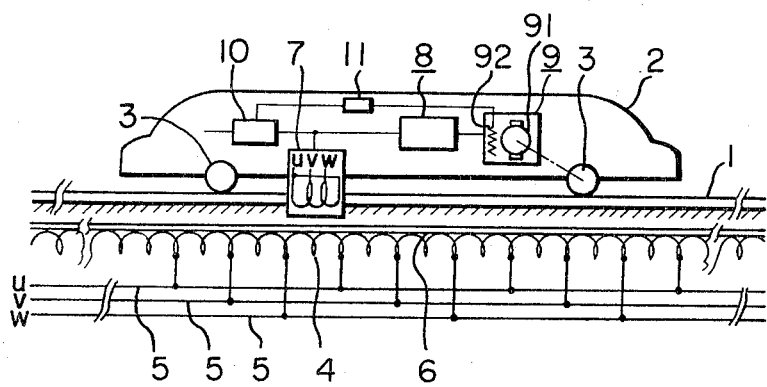
FIG. 1 is a diagrammatic view showing an arrangement of an embodiment of the present invention.
Figure 2:
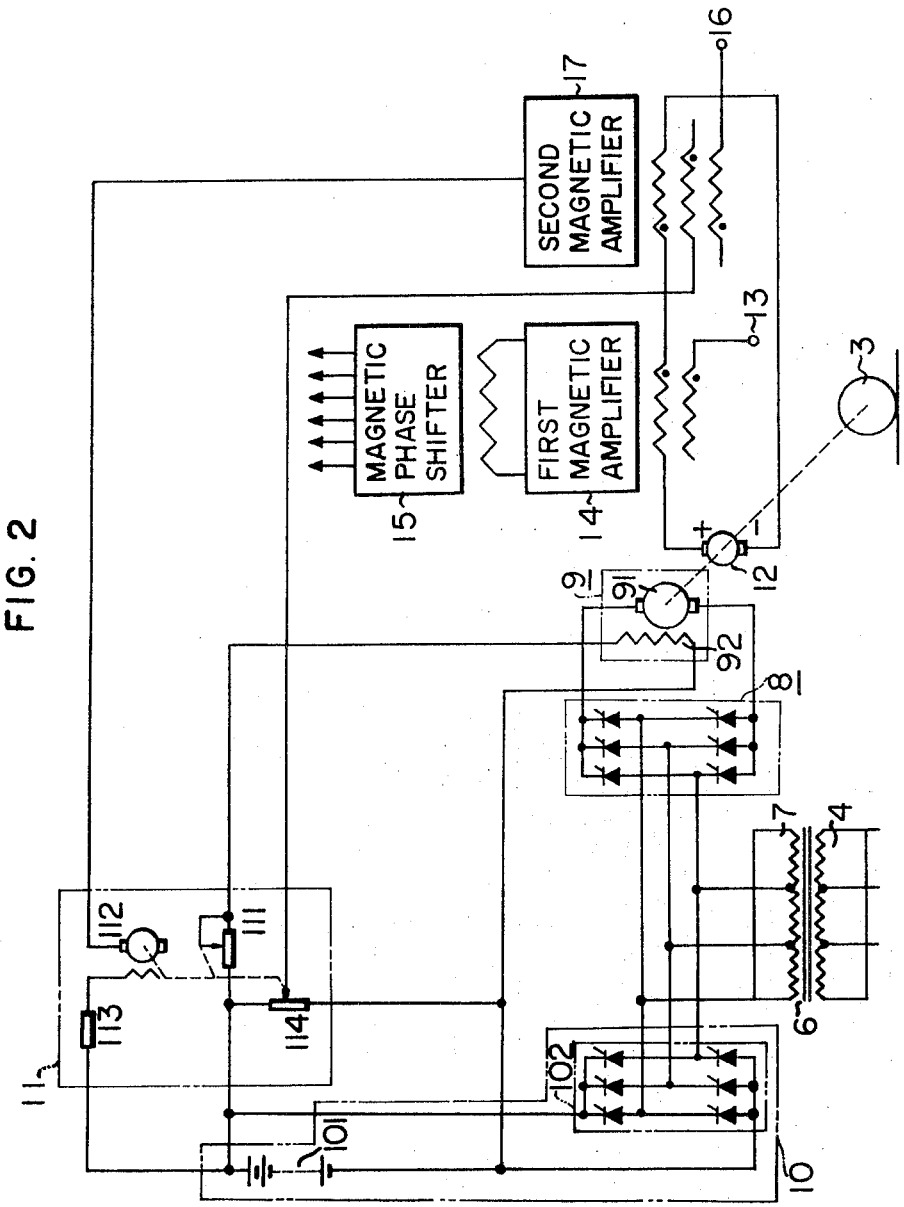
FIG. 2 is a connection diagram of the electric car driving system shown in FIG. 1.
Figure 3:
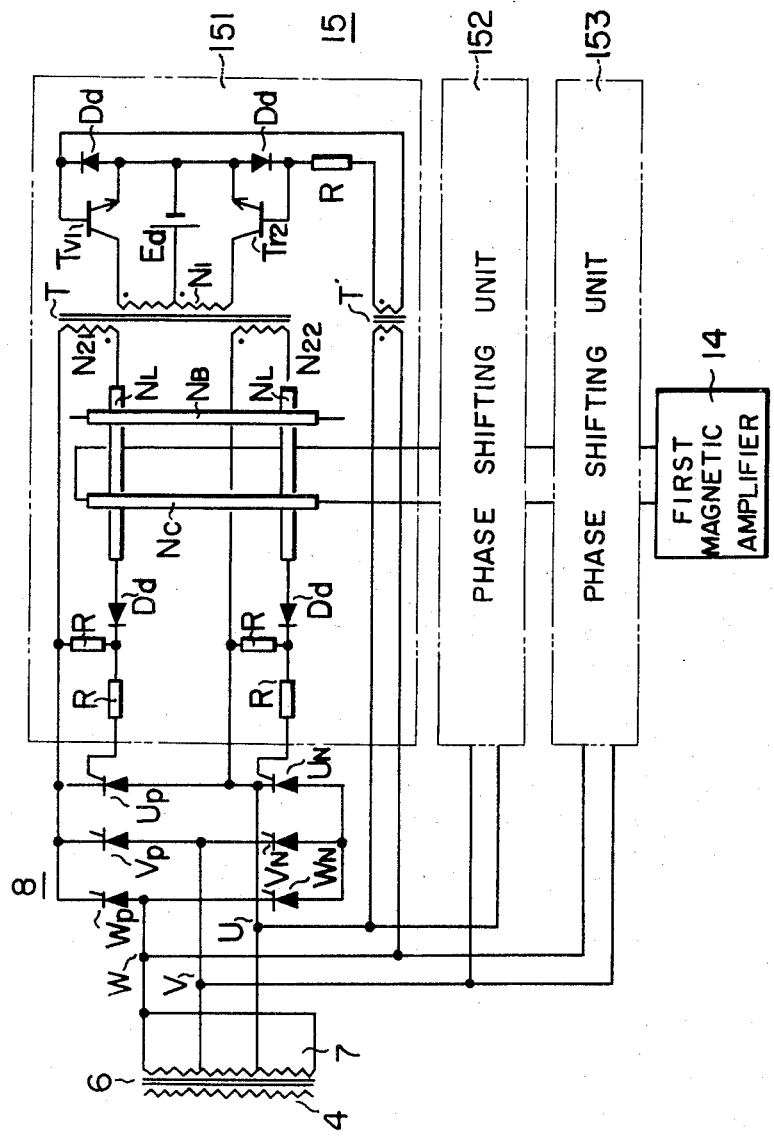
FIG. 3 is a detailed circuit diagram of a trigger circuit shown in FIG. 2.

Referring to FIG. 1, a car body 2 is supported on rails or track 1 by rail engaging wheels 3. A primary winding 4 of a linear motor is disposed along the track 1, and a three-phase a.c. power source 5 supplies electric power to the primary winding 4 by way of three lines of the U-phase, V-phase and W-phase. An iron core 6 is disposed along track 1, and a secondary winding 7 of the linear motor is mounted in the car body 2. The number of turns of the secondary winding 7 is relatively small compared with that of the primary winding 4. A controllable power converter 8 is connected to the output ends $u$, $v$ and $w$ of the secondary winding 7 and may, for example, be a thyristor bridge circuit as shown in FIGS. 2 and 3. A load 9 is connected to the output of the power converter 8 and is shown herein as a d.c. motor. The d.c. motor 9 is connected to the wheels 3 by mechanical transmission means (not shown) and includes an armature 91 and a field winding 92. An auxiliary power source 10 (which will be described in detail later) for supplying the lighting and other power requirements in the car is also connected to the output ends $u$, $v$ and $w$ of the secondary winding 7, and a portion of the output of the auxiliary power source 10 is connected to the field winding 92 of the d.c. motor 9 through a field controller 11. Means for floating the car body 2 above the track 1 are not shown in FIG. 1.

The operation of the driving system according to the present invention will now be briefly described with reference to FIG. 1. In the state in which the speed of the car is low, the weight of the car body 2 is substantially supported by the wheels 3 and a sufficiently large adhesive effort is produced between the wheels 3 and the rails 1. In this low speed range, a considerably large a.c. voltage is induced in the secondary winding 7 of the linear motor. This a.c. voltage is converted into a d.c. voltage by the power converter 8 composed of a plurality of thyristors and is then applied to the driving motor 9. Thus, the driving motor 9 causes rotation of the wheels 3 and the car is gradually accelerated. The propulsive force is also produced by the linear motor. However, due to the fact that the triggering phase angle $\alpha$ for the thyristors in the power converter 8 controlled by a trigger circuit described later is initially sufficiently large, lagging current flows through the secondary winding 7 and the propulsive force produced by the linear motor is extremely small. Therefore, almost all of the force accelerating the car is produced solely by the driving motor 9.

With the increase in the speed of the car, the counter electromotive force in the driving motor 9 increases correspondingly with the result that the triggering phase angle $\alpha$ for the thyristors constituting the power converter 8 is decreased, and at the same time, the field controller 11 acts to weaken the energization of the field winding 92 of the driving motor 9. Consequently, the voltage induced in the secondary winding 7 of the linear motor is reduced resulting in a further decrease of the triggering phase angle $\alpha$ until finally the phase of the current flowing through the secondary winding 7 becomes substantially equal to the phase of the voltage. Therefore, the propulsive force produced by the linear motor is increased, whereas the propulsive force produced by the driving motor 9 is decreased. When the speed of the car is further increased, the car is propelled substantially solely by the propulsive force produced by the linear motor.

While, with such an arrangement, the speed control of the linear motor and driving motor 9 can be attained by controlling either the power converter 8 or the field controller 11, it is preferable and effective to control both the power converter 8 and the field controller 11 at the same time in order to ensure a smooth transition of the propulsive force from the driving motor 9 to the linear motor and to control the speed of the car over a wide range. By the above manner of control, the speed of the car is increased to a sufficiently high level at the time at which the linear motor produces almost all of the propulsive force so that the car body 2 starts to float above the track 1 by the action of the floating means (not shown) and the weight of the car body 2 is not substantially supported by the wheels 3.

The auxiliary power source 10 is provided for supplying the lighting and other power requirement in the car. In the low speed range in which the driving motor 9 is driving the car, a considerably large voltage is induced in the secondary winding 7 of the linear motor and electric power can be derived from the output ends $u$, $v$ and $w$ of the secondary winding 7. In the high speed range in which the linear motor participates solely in the production of the propulsive force, this linear motor can ideally be controlled up to the synchronous speed. In this state, no voltage would be induced in the secondary winding 7 any more. Practically, however, the speed range up to about 70 percent of the synchronous speed is selected to be the control range taking into consideration the factor such as slip. Thus, a voltage sufficient for supplying the auxiliary power requirement can be induced in the secondary winding 7. The auxiliary power source 10 is connected to the output ends $u$, $v$ and $w$ of the secondary winding 7 so that it can serve also as a source for energizing the field winding 92 of the driving motor 9 as seen in FIG. 1.

While an embodiment of the present invention has been described with reference to the case in which the power converter 8 is in the form of a thyristor device as shown in FIG. 2 and the driving motor 9 is a d.c. motor, means such as a thyristor motor including a cycloconverter (corresponding to the power converter 8) may be employed to attain substantially the same effect.

The driving system according to the present invention will be described in more detail with reference to FIG. 2. Referring to FIG. 2, the a.c. output voltage of the secondary winding 7 of the linear motor is converted into a d.c. voltage by the power converter or controlled rectifier device 8 to be applied to the driving motor 9 as described with reference to FIG. 1. Beside the wheels 3, a speed responsive or rate generator 12 is connected to the driving motor 9, and the output of this rate generator 12 is applied to a control winding of a first and a second magnetic amplifier 14 and 17. An input signal indicative of a reference speed is applied to another control winding of the first magnetic amplifier 14 through an input terminal 13, and a biasing input is applied to another control winding of the second magnetic amplifier 17 through an input terminal 16. The output of the first magnetic amplifier 14 is proportional to the difference between the car speed and the reference speed and is applied to a control winding Nc (FIG. 3) of a trigger circuit or magnetic phase shifter 15. The output of the second magnetic amplifier 17 is applied to a pilot motor 112. A field resistor 111 is regulated by the pilot motor 112, and the voltage corresponding to the field current is detected by a voltage dividing resistor 114 arranged for interlocking operation with the pilot motor 112 and produces a flow of current through another control winding of the second magnetic amplifier 17.

Figure 4:
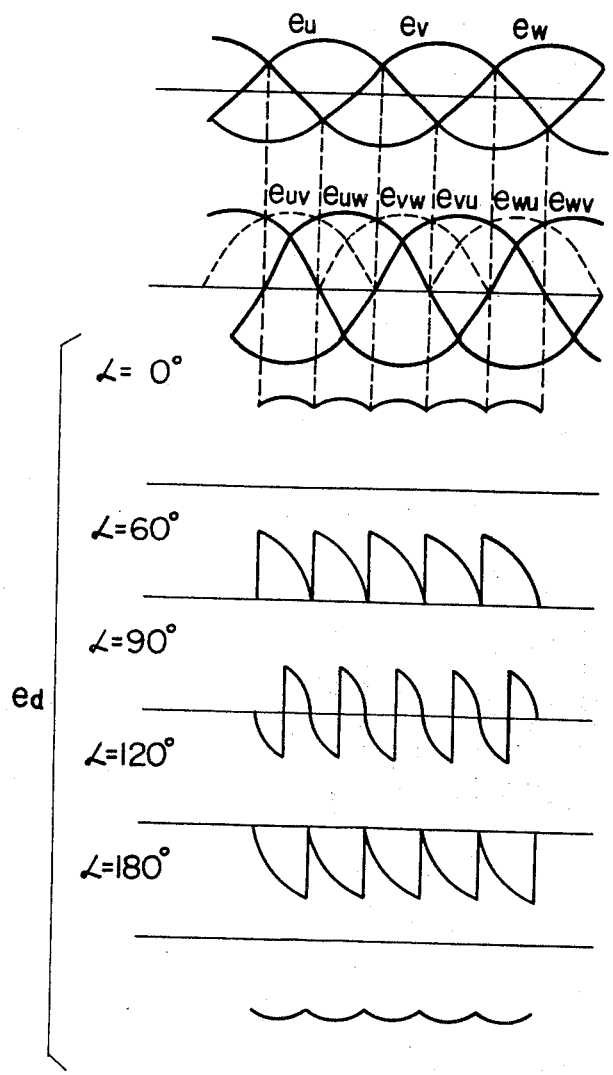
FIG. 4 shows waveforms for illustrating the operation of a power converter shown in FIG. 2.

FIG. 4 shows waveforms for illustrating the operation of the power converter 8. In FIG. 4, $e_U$, $e_V$ and $e_W$ represent the voltages of the U-phase, V-phase and W-phase respectively. Suppose, for example, that the triggering phase angle $\alpha$ is measured on the basis of the voltage ($e_U - e_W$). Then, the d.c. output voltage $e_d$ of the power converter 8 is the positive maximum, zero and negative maximum when $\alpha = 0°$, $\alpha = -90°$ and $\alpha = -180°$ respectively, provided that the armature 91 produces a negative voltage and the current is continuous.

FIG. 3 shows in detail the structure of the trigger circuit or magnetic phase shifter 15. The power converter 8 is a three-phase thyristor bridge circuit, and therefore, the magnetic phase shifter 15 is composed of three phase shifting units 151, 152 and 153 all of which are of the same structure. In FIG. 3, the structure of only one of these units is shown to avoid confusion. When controlling, for example, thyristors $U_P$ and $U_N$ of the U-phase in the power converter 8, the voltage ($e_U - e_W$) may be applied to the magnetic phase shifter 15 as a synchronizing signal as will be apparent from FIG. 4. This voltage is applied to a transformer T' and the output of the transformer T' is applied through a resistor R to a pair of transistors $T_{r1}$ and $T_{r2}$ for alternately turning on and off these transistors $T_{r1}$ and $T_{r2}$. Therefore, the voltage Ed of a d.c. power source is applied alternately to respective halves of a primary winding $N_1$ of a transformer T, and a rectangular waveform voltage appears across secondary windings $N_{21}$ and $N_{22}$ of the transformer T. The interposition of the transistors $T_{r1}$ and $T_{r2}$ is effective in producing a rectangular waveform voltage of constant amplitude in the magnetic phase shifting unit 151 even if the voltage ($e_U - e_W$) may fluctuate considerably. This rectangular waveform voltage appears across each output winding $N_L$ of the magnetic phase shifting unit 151 to be applied to the thyristors $U_P$ and $U_N$ of the U-phase in the power converter 8. Thus, the thyristors $U_P$ and $U_N$ can be fired with the phase angle corresponding to the ampere-turns of the control winding $N_C$ which energized by the output of the first magnetic amplifier 14. The phase shifting unit 151 includes a bias winding $N_B$, a plurality of diodes $D_d$ and a plurality of resistors R. By suitably adjusting the bias current supplied to the bias winding $N_B$, the output of the phase shifting unit 151 can be reduced to a minimum, that is, the triggering phase angle $\alpha$ of 180° for the thyristors $U_P$ and $U_N$ can be obtained when the current flowing through the control winding $N_C$ is zero. Other thyristors $V_P$, $V_N$, $W_P$ and $W_N$ are similarly fired by the phase shifting units 152 and 153. It will be seen that the rate generator 12, reference speed signal input terminal 13, first magnetic amplifier 14, magnetic phase shifter 15 and power converter 8 constitute a speed feedback control system.

Referring to FIG. 2 again, the second magnetic amplifier 17 supplies to the pilot motor 112 in the field controller 11 a current which corresponds to the car speed responsive output of the rate generator 12. The pilot motor 112 actuates the slide arm of the voltage dividing resistor 114 and the terminal voltage of the potentiometer 114 is negatively fed back to the second magnetic amplifier 17 so that these means constitute a servo system. Further, the pilot motor 112 acts to control the field winding 92 of the driving motor 9 depending on the speed of the car due to the fact that the pilot motor 112 is arranged to actuate the slide arm of the field resistor 111 interposed in the field energizing circuit leading from the auxiliary power source 10 to the field winding 92 of the driving motor 9. In other words, the pilot motor 112 controls the field in such a manner that the field is weakened with the increase in the speed. In this case, the speed level at which the field-weakening control is started can be freely selected depending on the level of the bias input applied to the input terminal 16 of the bias winding of the second magnetic amplifier 17. It will be seen that the rate generator 12, second magnetic amplifier 17, pilot motor 112, variable resistors 111 and 114, and field winding 92 of the driving motor 9 constitute a field-weakening control system.

In the driving system of the present invention having such an arrangement, the reference speed signal input is zero when the car is at rest, and this input is gradually increased as the car is accelerated. In the low speed range, a large voltage is induced in the secondary winding 7 of the linear motor. However, the reference speed signal input is in the low level in the low speed range. Therefore, the output of the first magnetic amplifier 14 is low, and the output of the magnetic phase shifter 15 for triggering the thyristors in the power converter 8 is low. In this state, the triggering phase angle $\alpha$ is large, but it is not larger than 90°. With the increase in the speed of the car, the triggering phase angle $\alpha$ approaches zero. In the meantime, the control input applied from the rate generator 12 to the control winding of the second magnetic amplifier 17 starts to overcome the bias input to the bias winding of the second magnetic amplifier 17, and an output appears from the second magnetic amplifier 17, and an output appears from the second magnetic amplifier 17. As a result, the pilot motor 112 is rotated to reduce the resistance of the resistor 111, and at the same time, the output voltage of the voltage dividing resistor 114 is increased. Thus, the output of the second magnetic amplifier 17 is gradually decreased to zero by the servo action of the servo system.

FIG. 4 shows variations in the waveform of the d.c. output voltage $e_d$ of the power converter 8 corresponding to the variations of the triggering phase angle $\alpha$ between 0° and 180°. It will be seen from FIG. 4 that the mean value of the d.c. output voltage $e_d$ is zero when $\alpha = 90°$. The triggering phase angle $\alpha$ is gradually decreased from the above value in response to the speed instruction. Therefore, when the slip of the linear motor is small and the secondary voltage thereof is sufficiently high, the triggering phase angle $\alpha$ may be decreased so that a sufficiently high d.c. voltage can be applied to the d.c. motor 9 for starting and accelerating the car by the d.c. motor 9. In this case, the linear motor does not develop sufficient torque due to the fact that lagging current including a reactive component in a high proportion flows through the secondary side thereof. However, with the gradual decrease in the triggering phase angle $\alpha$, the lagging current component is gradually decreased and the reactive power is decreased so that the accelerating torque of the linear motor is increased. Therefore, the car is accelerated by the combined torque of the d.c. motor 9 and linear motor. The triggering phase angle $\alpha$ is finally decreased to zero when the speed of the accelerated car attain a level of the order of 300 kilometers per hour at which the slip of the linear motor is of the order of 0.5. In the vicinity of this speed level, the d.c. motor 9 develops its maximum torque, but any further increase in the speed cannot be attained due to the fact that the secondary voltage of the linear motor is decreased. It is therefore desirable to start to apply the field-weakening control in the vicinity of the speed of 300 kilometers per hour. To this end, the bias input corresponding to this speed is applied to the terminal 16 of the bias winding of the second magnetic amplifier 17 shown in FIG. 2.

The application of the field-weakening control increases the speed of the d.c. motor 9, but in a short period of time, any substantial torque is not developed by the d.c. motor 9, and the linear motor participates solely in the acceleration of the car thereafter. In the course of the acceleration of the car by the linear motor, the car is sufficiently floated above the track 1 by the action of the superconducting magnet thereby freeing the wheels 3 from supporting the load. Thereafter, the car is accelerated by the linear motor up to a desired speed of, for example, 500 kilometers per hour.

By the way, in such a very high speed car is encountered the difficulty of the provision of a current collecting device as described previously, and this loads to the difficulty of supplying power to lighting and other equipment in the car. To meet the above requirement, the auxiliary power source 10 including a battery 101 and a controlled rectifier device 102 for charging the battery 101 is provided in the driving system according to the present invention. The controlled rectifier device 102 is connected to the secondary winding 7 of the linear motor to receive the input therefrom and charges the battery 101 in a floating manner through a constant voltage means (not shown) during the period of time in which the voltage across the secondary winding 7 is sufficiently high. The auxiliary power source 10 can thus supply power required by lighting and other equipment in the car and acts, at the same time, as a field energizing power supply for the d.c. motor 9.

The power converter 8 may be a cycloconverter and the load 9 may be a commutatorless motor. The cycloconverter includes a direct conversion type in which an a.c. voltage is directly converted into an a.c. voltage having a frequency different from that of the former and an indirect conversion type in which an a.c. voltage is converted into a d.c. voltage and this d.c. voltage is converted into an a.c. voltage again. Either of these types can be constituted by thyristors and control means therefor. The output voltage of such a cycloconverter may be applied to a synchronous machine for constituting a so-called commutatorless motor or thyristor motor. This thyristor motor may be connected to the wheels and may be controlled in the manner similar to that described with reference to FIG. 2.

What we claim is:

1. A driving system for an electric car comprising a linear motor for propelling the car including a primary winding disposed along a track on the ground to be energized by an a.c. power source and a secondary winding disposed on the car opposite to said primary winding, controllable power converting means connected to said secondary winding for providing a controllable power output, a rotary machine connected to said power converting means for being driven with the output of said power converting means, and traction wheels for the car connected to said rotary machine and being driven thereby for propelling the car.

2. A driving system as claimed in claim 1, further comprising means for instructing the speed of the car, means for detecting the speed of the car, comparing means for delivering a signal representative of the difference between the instructed speed and the actual speed of the car, and means for controlling said power converting means in response to the application of the signal representative of the speed difference.

3. A driving system as claimed in claim 1, wherein said controllable power converting means is a controlled rectifier means and said rotary machine is a d.c. motor.

4. A driving system as claimed in claim 3, further comprising means for instructing the speed of the car, means for detecting the speed of the car, comparing means for delivering a signal representative of the difference between the instructed speed and the actual speed of the car, and means for controlling said controlled rectifier means in response to the application of the signal representative of the speed difference.

5. A driving system as claimed in claim 3, further comprising means for detecting the speed of the car, and field control means for weakening the field excitation of said d.c. motor in response to the increase in the actual speed of the car, the car being propelled principally by the d.c. motor at low speeds and principally by the linear motor at high speeds.

6. A driving system as claimed in claim 1, further comprising auxiliary power source means connected to said secondary winding.

7. A driving system as claimed in claim 5, further comprising auxiliary power source means connected to said secondary winding for supplying current to said field control means.

* * * * *